May 2, 1939. A. A. JOHNSON 2,157,056
WINDSHIELD HEATER
Filed Jan. 29, 1936 2 Sheets-Sheet 1
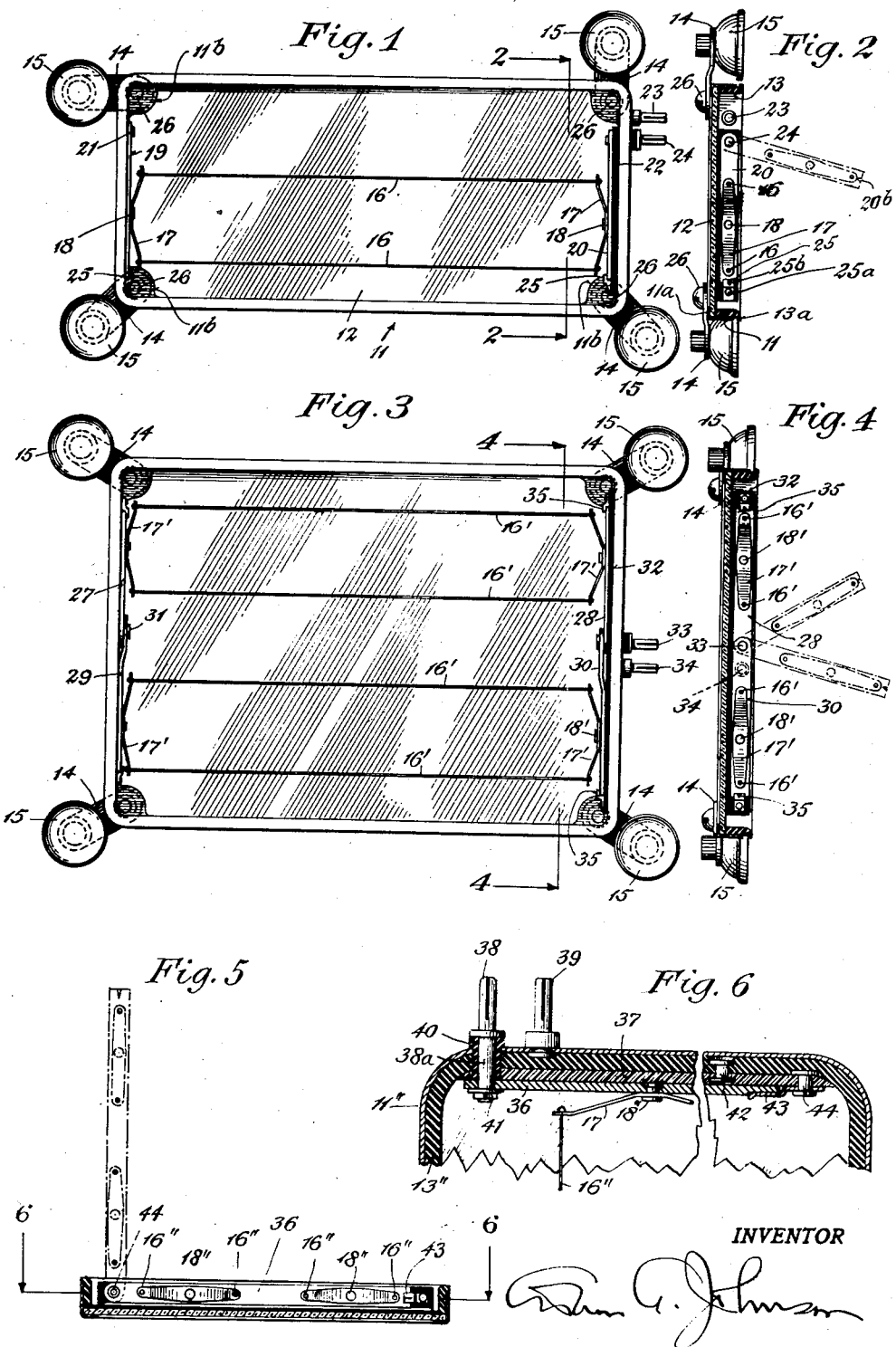
INVENTOR May 2, 1939.  A. A. JOHNSON  2,157,056
WINDSHIELD HEATER
Filed Jan. 29, 1936  2 Sheets-Sheet 2
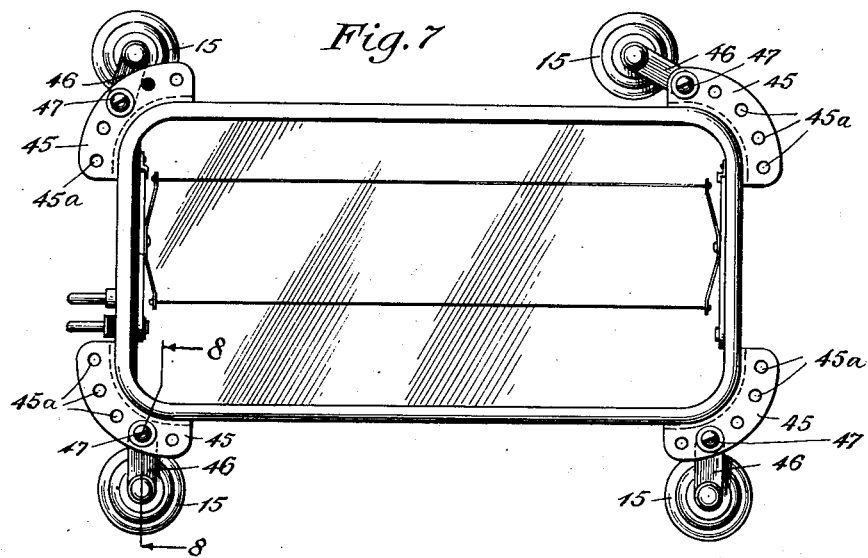
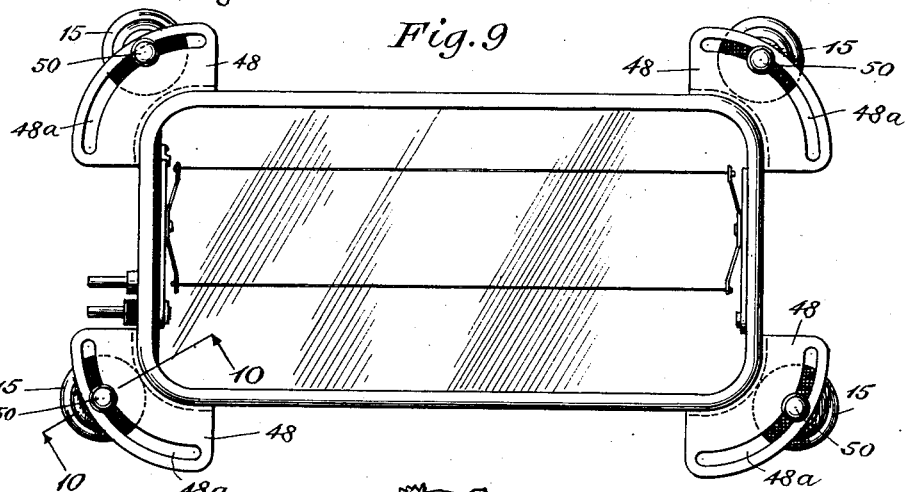
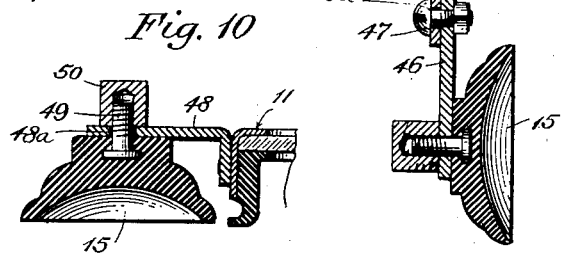
INVENTOR Patented May 2, 1939

2,157,056

UNITED STATES PATENT OFFICE 2,157,056

WINDSHIELD HEATER

Arthur A. Johnson, Bridgeport, Conn., assignor to Casco Products Corporation, Bridgeport, Conn., a corporation of Connecticut Application January 29, 1936, Serial No. 61,306

9 Claims. (Cl. 219—19)

This invention relates to windshield heaters and defrosters, and has particular reference to such devices which employ electrical heating elements, as wires, for heating a portion of the windshield of a motor vehicle to preclude the formation of frost or accumulation of snow and to melt away and remove any frozen moisture which may have formed or accumulated.

Heretofore, these devices have included a casing incorporating a frame and a transparent plate, usually of glass, such casing being adapted to be secured against the windshield so as to close a space thereon in the line of vision of the driver. One or more electric resistance wires are usually extended across the transparent plate for transmitting heat to the windshield, while current is passing through the wires. The glass or other transparent plate of the casing is commonly arranged parallel with, and fairly close to, the windshield, and a resistance wire extended across the casing is in close proximity to the glass of the casing. These devices are subjected to such considerable handling, incidental to repeated placements of the same against the windshield and intervening removals therefrom, that finger print smudges, lint, and dirt accumulate on the inner face of the glass of the casing. As a result, and aggravated by repeated moisture condensations against the inner face of the glass, it frequently happens that clear vision through the glass is more or less obscured if not seriously interfered with. Yet the presence of the resistance wires and their immediate mountings has made it difficult to effect a thorough cleansing of the inner face of the closely adjacent glass, and impossible to do so with ease and without danger of injuring some one or more of the heat-supplying parts.

An object of the invention is to provide means whereby the resistance wires may be quickly and simply relocated relatively to the glass and thereby temporarily removed from their normal positions obstructive to easy and thorough cleansing of the inner face of the glass. In the preferred forms of the invention this object is accomplished by mounting a resistance wire or wires on one or more arms pivotally carried by the casing in such manner that they can be swung outwardly of the general plane of the casing to remove the resistance wires considerably from their normal close adjacency to the glass of the casing.

Giving consideration to another aspect of the present invention, a way now favored in the art for quickly and conveniently mounting and demounting a heater or defroster relatively to a windshield has involved the employment of suction cups, fixedly offset beyond the bounds of the casing. As is well known a heater or defroster is removed from the windshield fairly frequently during the winter season, either because severe weather conditions have abated, or because the glass of the casing must be cleaned on its inner face; and consequently, such a mounting as that afforded by suction cups is very desirable. It has been found that, due to narrow windshields, rounded corners for the reveal openings thereof, and other features characteristic of recent developments in the streamlining of motor vehicle bodies, difficulties are encountered in attempting to employ the suction cup securing means advantageous for quick and easy mounting and demounting of the heater or defroster. Even in the case of a defrosting device of comparatively small size, a fixed arrangement of the suction cups on the casing, which will allow proper positioning of the same in the most desirable position on a windshield of one model of motor car, results in a location for these cups or their mounting such that they are in the way when the device is attempted to be properly positioned on another model of car.

This invention, then, for another object, aims to avoid the difficulty last explained; and to this end the suction cups are mounted on the casing in such manner that they can be moved relatively thereto. In the preferred forms of the invention, a plurality of suction cups are permanently carried by the casing yet in such manner that they are individually movable relatively not only to the casing, but to another or others of the cups, and toward or away from a corner, or a horizontal or vertical edge of the casing, whereby the device can have its suction cup equipment readily rearranged to meet the requirement or preference of the user.

The invention will be more clearly understood, and the various advantages thereof appreciated, from the following detailed description of several of the various possible physical embodiments thereof illustratively shown in the accompanying drawings, in which:

Figure 1 is a front face view showing one of said embodiments, that is, looking toward that side thereof which is placed against a windshield when the device is applied thereto.

Fig. 2 is a transverse sectional view, taken on the line 2—2 of Fig. 1.

Fig. 3 is a view similar to Fig. 1, showing another embodiment.

Fig. 4 is a view similar to Fig. 2, taken on the line 4—4 of Fig. 3.

Fig. 5 is a transverse section, illustrating still another embodiment.

Fig. 6 is a section, on a somewhat enlarged scale, taken on the line 6—6 of Fig. 5.

Fig. 7 is a view similar to Fig. 1, showing another embodiment.

Fig. 8 is an enlarged fragmentary section, taken on the line 8—8 of Fig. 7.

Fig. 9 is a view similar to Fig. 1, showing still another embodiment.

Fig. 10 is a view similar to Fig. 8, taken on the line 10—10 of Fig. 9.

Referring in detail to that physical embodiment of the invention herein disclosed in Figs. 1 and 2 as exemplary thereof, a casing is shown which includes a metal frame 11 within which is fitted a glass 12; this glass being at the rear side of the frame, or that side of the latter which faces the driver, and there lying under a flange 11a running around the frame opening. Tight within the main portion of the frame and abutting the front or inner face of glass 12 is a liner 13 of soft rubber. This liner projects beyond the front side of the frame, and has an outer peripheral rib 13a somewhat beyond the front limit of the frame, between which rib and said limit is a liner portion of reduced cross-section.

The frame 11 is so constructed that at each of its four corners it incorporates webs 11b, by way of which four arms 14 are secured to the frame, these arms carrying suction cups 15. The arrangement of the parts is desirably such that the portion of the liner 13 of thin cross-section between the front limit of the frame and rib 13a will allow the liner to be easily squeezed and compressed against the windshield as the cups 15 are forced against the windshield, and so that when these cups finally dispose themselves to cling in the appointed manner to the windshield, the rib 13 will lie tightly against the windshield and enclose the interior of the casing in a substantially dust-tight manner.

In the form of the invention now being described two resistance wires 16 are shown, stretched taut between the outer ends of a pair of leaf-springs 17 secured at their centers by rivets or studs 18. One of these springs is thus anchored to a metal carrier 19, and the other to a metal carrier 20. The carrier 19 lies against the rubber liner 13 but is secured to the frame 11 by a rivet or stud 21, thereby grounding the wires 16, through the leaf-spring on the carrier 19, and said carrier, to the frame. The carrier 20, however, is insulated from the frame by being mounted on a fibre strip 22 suitably secured to the frame in a manner, for instance, according to the showing of Fig. 6 below described, to avoid short-circuiting said carrier and the frame. At one side the frame carries a pair of split-post terminals 23 and 24, the former of which is grounded to the frame, and the latter of which is insulated from the frame but electrically connected to the carrier 20 by being passed through the liner 13 and the fibre strip 22 to and through the carrier. Thus when the terminals 23 and 24 are connected to a suitable current supply, the circuit for the wires 16 is completed, current flowing from terminal 24, through the carrier 20, said wires the carrier 19, and frame 11, to the terminal 23.

The carriers 19 and 20 are arms pivotally mounted at their hereinabove mentioned points of permanent securement within the casing. In order to hold these carriers within the interior of the casing in the positions shown in full line, metal clips 25 are suitably secured in place as shown at 25a, and these clips are so shaped and located that they securely hold the carriers in their full line positions.

As indicated at 25b in Fig. 2 each clip 25 is shaped to present at its under side a teat or teat-receiving recess engageable with a coacting recess or teat, as indicated at 20b in Fig. 2, on the free end of the carrier 19 or 20 caught under the clip when the heating wires 16 are brought into operative relation to the glass 12. Due to the pull on the leaf-springs 21 by the taut wires, and because the carriers 19 and 20 are themselves of metal and somewhat resilient, these coacting teats and recesses are interlocked positively, and there is no chance for the carriers to become accidentally disengaged from their clips at any time. Leaf-spring or equivalent mountings for the wires are now preferred, for the reason just stated, and because when the wires are thus resiliently mounted they will be held taut at all times and against drooping as the result of elongation when heated.

When, however, it is desirable to give a thorough yet quick cleansing to the front or inner face of the glass 12, all that is required as a preliminary is to swing the arms 19 and 20 to dispose them as illustrated in broken lines in Fig. 2, thus to clear the wires 16 well away from the glass 12. When the front or inner face of the glass has been cleaned, these arms are swung back into reengagement with the clips 25 and to arrange the wires 16 as before in the interior of the casing and close up against the glass 12. During all these manipulations, there has been no necessity for taking down any electrical parts or disturbing in any way the electrical continuity of the assemblage between the terminals 23 and 24.

The heating or defrosting device is readily mountable and demountable relative to the windshield, to permit said manipulations whenever required and as often as desired, due to the suction cup mounting means. At the same time the device is thus mountable and demountable relatively to the windshield of any particular motor car on which it is intended for use, due to the fact that the suction cup mountings and consequently the cups themselves, are adjustable in an appointed plane relative to the bounding edges of the casing. In the present case, this adjustability of the suction cups follows from the fact that the arms 14, which carry the cups at their outer ends, and which at their inner ends are secured as aforesaid to the webs 11b of the frame, are pivotally connected as at 26 to these webs.

Referring to the form of the invention shown in Figs. 3 and 4, a casing of a different size and shape is illustrated, but one still having its suction cups 15 adjustable because the latter are carried at the outer ends of arms 14 pivotally mounted at the corner of the casing. This casing has, as illustrated, a rubber liner corresponding to the liner 13, and includes a glass corresponding to the glass 12 of Fig. 1. In this form of the invention, also, a plurality of electrical resistance wires are stretched across the interior of the casing; there being four such wires, 16', connected to each of two pairs of leaf-springs 17' mounted as in Fig. 1, that is: with each leaf-spring on its own carrier or swing-arm 27, 28, 29 or 30. The carriers 27 and 29 overlap, as do the carriers 28 and 30; the first two carriers being grounded to the frame and pivotally mounted thereon by way of a single rivet or stud 31 going to the frame. The other two carriers are mounted in the frame similarly on a common pivot, but are insulated from the frame because mounted on a fibre strip 32 itself attached to the frame like the fibre strip 22 of Fig. 1, in such manner that its attaching elements do not short-circuit these carriers and the frame. Split-post terminals, here marked 33 and 34, corresponding to the terminals 23 and 24 of Fig. 1, are provided at a convenient point on the casing; the terminal 34 being grounded to the frame, and the terminal 33 passing through the rubber liner and the fibre trip 32, and carrying as a part thereof the common pivotal mounting for the carriers 28 and 30 and so being electrically connected to such carriers.

Thus, here also, the four wire carriers are all swing arms pivotally mounted at their points of permanent securement within the casing; and metal clips 35, corresponding to the clip 25 of Fig. 1 and secured in place similarly to this last, are provided for frictionally engaging the free ends of the four swing arms to hold the four wires 16' in close adjacency to the glass of the casing with the parts normally disposed as shown in full lines.

When the front or inner face of said glass is to be cleansed, the arms or carriers 27, 28, 29 and 30 are swung outwardly in two pairs, the carriers 27 and 28 as one pair, and the carriers 29 and 30 as the other pair, to the positions shown in broken lines in Fig. 4, and to clear the wires 16' well away from the glass surface to be cleansed.

Figs. 5 and 6 illustrate a construction wherein four electrical resistance wires 16" are present as in Fig. 3, but all stretched between a single pair of swinging-arm carriers one of which is shown at 36; so that, when the front or inner face of the glass is to be cleansed, all the wires may be cleared away from such glass surface by swinging this pair of carriers to the broken line position shown in Fig. 5.

Fig. 6 serves also to illustrate clearly certain more or less unimportant details of construction hereinabove referred to in describing the forms of the mounting shown in Figs. 1 to 4. In Fig. 6 there will be noted the metal casing, marked 11", the rubber liner, marked 13", and a fibre strip 37, to facilitate mounting a carrier, in the present case the aforesaid carrier 36, so as to avoid short-circuiting that carrier to the casing. Of the two split-post terminals, here respectively marked 38 and 39, the terminal 39, by its own reduced basal extension, is riveted directly to the casing. On the other hand, the terminal 38 is completely insulated from the casing, being sleeved by a bushing 40 throughout the length of its basal prolongation 38a up to the point where the latter passes through the carrier or swing arm 36, to project a threaded end to take a nut 41 to provide the pivotal mount for such arm. The fibre strip 37 is held in place by the passage therethrough of this pivotal mount, and by a rivet 42 clinched at one end against the outer side of the liner 13 and at its opposite end within a recess at the inner side of the fibre strip; and so the arm 36 may be pivotally swung relatively to the strip. The retaining clip for this arm 36, such clip marked 43, is secured to the fibre strip by a rivet 44, the outer head of which rivet is buried in the readily yieldable material of the rubber liner 13".

Referring finally to the forms of the invention shown in Figs. 7 to 10, these principally illustrate other possible adjustable mountings for the suction cups 15.

In Figs. 7 and 8, the frame of the device at its corners carries extension plates 45, each suitably rigidly secured to the frame, as by spot-welding, and each having a series of holes 45a spaced curvilinearly thereover. The cups are secured to the outer ends of comparatively short arms 46, the inner ends of which are pivotally interchangeable with the different holes of the appropriate plate 45; the pivotal connection illustrated being of the bolt and nut type as seen at 47. By this arrangement the cups, not being limited to swings through arcuate paths, one fixed as to each cup, can be brought when required into many more possible positions relative to the corners of the frame than with the construction illustrated in Figs. 1 to 4. For instance, the cups can be brought close up against the frame corners, or moved considerably away from such corners either along a diagonal of the frame or along a horizontal or vertical edge of the frame.

In Figs. 9 and 10, the frame of the device at its four corners carries extension plates 48 also to permit the suction cups 15 to be given widely variable mountings, including a positioning of the cups or some of them close up against the frame corners, yet by a construction according to which the cups are mounted directly on the frame extensions 28. Each of these extensions, it will be noted, has a curvilinear slot 48a cut therein so as to run around a rounded frame corner. The shank of a mounting bolt 49 (Fig. 10) on a cup passes through such slot, and by mere manipulation of the coacting nut 50, any cup can be tightened in place at any desired location along the length of a slot, or it can be loosened for shifting any cup to a new location along such slot, and tightened to secure such cup in its new location.

As indicated in Figs. 2 and 4, and as shown in detail in Fig. 8, the suction cups, whether carried by a rigid frame extension as in Fig. 10 or at the outer ends of swing arms as in Figs. 2, 4 and 8, or otherwise within the invention, are desirably held in place by a dependable mechanical coupling, such, for instance, as the bolt and nut means shown in all the forms and described in detail just above by use of the reference characters 49 and 50 in Fig. 10. Such a coupling, which incidentally can be easily operated to mount, remove, and remount a suction cup, either the same one or a substitute one, has been found to be a feature of considerable importance. This allows the suction cups to be left in their proper positions on the windshield at all times; the device being disconnected from the cups preparatory to its removal and again connected to them when replaced.

Variations and modifications may be made within the scope of this invention, and portions of the improvements may be used without others.

I claim:

1. A windshield heater comprising a frame, a transparent plate carried in said frame, means for mounting said frame with the plate spaced from a windshield, and electrical heating means interposed between said plate and the windshield, said heating means comprising strands of resistance wire stretched across said plate, movable arms at opposite sides of the frame to which said wires are secured, and mounting means for said arms whereby the same can be moved relatively to the frame to move said wires away from said plate.

2. A windshield heater comprising a frame, a transparent plate carried in said frame, means for mounting said frame with the plate spaced from a windshield, and electrical heating means interposed between said plate and the windshield, said heating means comprising strands of resistance wire stretched across said plate, movable arms at opposite sides of the frame to which said wires are secured, and means for releasably locking said arms in operative position on the frame with the wires in operative position relative to said plate.

3. A windshield heater comprising a frame, a transparent plate carried in said frame, means for mounting said frame with the plate spaced from a windshield, an electrical heating means interposed between said plate and the windshield, said heating means comprising strands of resistance wire stretched across said plate, movable arms at opposite sides of the frame to which said wires are secured, and pivots on the frame carrying said arms for swinging said wires toward and away from operative position relative to said plate.

4. A windshield heater comprising a frame, a transparent plate carried in said frame, means for mounting said frame with the plate spaced from a windshield, an electrical heating means interposed between said plate and the windshield, said heating means comprising strands of resistance wire stretched across said plate, movable arms at opposite sides of the frame to which said wires are secured, mounting means for said arms permitting movement thereof relative to the frame to move said wires away from said plate, and means for locking said arms in position to hold said wires in operative adjacency to said plate.

5. A windshield heater comprising a frame; a transparent plate carried in said frame; means for mounting said frame with the plate spaced from a windshield; an electrical heating means interposed between said plate and windshield; said heating means including a resistance wire extending over a large surface of the plate through which vision should be had, said resistance wire being normally so close to the plate as to obstruct easy access thereto for cleaning; and means for moving said heating means from said obstructing position and including structures pivotally mounted in the frame at opposite sides thereof and between which structures said wire is stretched.

6. A windshield heater comprising a frame; a transparent plate carried in said frame; means for mounting said frame with the plate spaced from a windshield; an electrical heating means interposed between said plate and windshield; said heating means including a plurality of wires extending over a large surface of the plate through which vision should be had, said resistance wires being normally so close to the plate as to obstruct easy access thereto for cleaning; and means for moving said heating means from said obstructing position and including a pair of structures each mounted in the frame at one of the opposite sides thereof for movement relative thereto and between which structures one of said wires is stretched, and another pair of structures each mounted in the frame at one of the opposite sides thereof for movement relative thereto and between which structures another of said wires is stretched.

7. A windshield heater comprising a frame; a transparent plate carried in said frame; means for mounting said frame with the plate spaced from a windshield; an electrical heating means interposed between said plate and windshield; said heating means including a resistance wire extending over a large surface of the plate through which vision should be had, said resistance wire being normally so close to the plate as to obstruct easy access thereto for cleaning; and means for moving said heating means from said obstructing position and including levers normally disposed in said frame but rockable out of the frame, said wire being stretched between said levers.

8. A windshield heater comprising a frame; a transparent plate carried in said frame; means for mounting said frame with the plate spaced from a windshield; an electrical heating means interposed between said plate and windshield, said heating means including a resistance wire extending over a large surface of the plate through which vision should be had, said resistance wire being normally so close to the plate as to obstruct easy access thereto for cleaning; means for moving said heating means from said obstructing position and including a set of spaced structures between which said wire is strung; and means for impositively holding one of said structures at one side of the frame and the other at the other side of the frame to place the wire in its normal disposition close to the plate but to permit movements of said structures relative to the frame in order to move the wire away from the frame and the plate, wherein each of said structures includes an arm pivoted to and within the frame and a resilient extension from such arm to which a wire is attached.

9. A windshield heater comprising a frame; a transparent plate carried in said frame; means for mounting said frame with the plate spaced from a windshield; an electrical heating means interposed between said plate and windshield, said heating means including a resistance wire extending over a large surface of the plate through which vision should be had, said resistance wire being normally so close to the plate as to obstruct easy access thereto for cleaning; and means for moving said heating means from said obstructing means including a pivotally mounted arm and a leaf spring carried thereby, an end of the wire being secured to said leaf spring.

ARTHUR A. JOHNSON.